US012609424B2

(12) United States Patent
Park

(10) Patent No.: US 12,609,424 B2
(45) Date of Patent: Apr. 21, 2026

(54) BATTERY MODULE TO WHICH HEAT SHRINKABLE FILM IS APPLIED, AND BATTERY PACK AND VEHICLE INCLUDING SAME

(71) Applicant: LG ENERGY SOLUTION, LTD., Seoul (KR)

(72) Inventor: Jun-Hee Park, Daejeon (KR)

(73) Assignee: LG ENERGY SOLUTION LTD., Seoul (KR)

( * ) Notice: Subject to any disclaimer, the term of this patent is extended or adjusted under 35 U.S.C. 154(b) by 637 days.

(21) Appl. No.: 18/017,835

(22) PCT Filed: Aug. 18, 2021

(86) PCT No.: PCT/KR2021/010979
§ 371 (c)(1),
(2) Date: Jan. 24, 2023

(87) PCT Pub. No.: WO2022/039504
PCT Pub. Date: Feb. 24, 2022

(65) Prior Publication Data
US 2023/0261349 A1 Aug. 17, 2023

(30) Foreign Application Priority Data
Aug. 21, 2020 (KR) ........................ 10-2020-0105288

(51) Int. Cl.
H01M 50/588 (2021.01)
B60L 50/64 (2019.01)
(Continued)

(52) U.S. Cl.
CPC ........... H01M 50/588 (2021.01); B60L 50/64 (2019.02); H01M 10/482 (2013.01);
(Continued)

(58) Field of Classification Search
CPC ............. H01M 50/588; H01M 50/296; H01M 50/211; H01M 50/507; H01M 50/271; H01M 10/653; H01M 10/482; B60L 50/64
(Continued)

(56) References Cited

U.S. PATENT DOCUMENTS

2008/0057393 A1* 3/2008 Onuki ............... H01M 10/0481
429/159
2011/0159351 A1 6/2011 Culver et al.
(Continued)

FOREIGN PATENT DOCUMENTS

CN 202395073 U 8/2012
CN 209232841 U 8/2019
(Continued)

*Primary Examiner* — James M Erwin
(74) *Attorney, Agent, or Firm* — Bryan Cave Leighton Paisner LLP

(57) ABSTRACT

A battery module includes a cell stack assembly. The cell stack assembly includes a cell stack having a plurality of battery cells and a buss bar frame assembly covering a first side of the cell stack an da second side of the cell stack. The battery module further includes a thermal shrink film covering the cell stack assembly. The battery module further includes a module housing accommodating the cell stack assembly covered by the thermal shrink film. The battery module further includes an end plate covering an opening at a first side of the module housing or a second side of the module housing.

20 Claims, 10 Drawing Sheets

(51) Int. Cl.

| | |
|---|---|
| *H01M 10/48* | (2006.01) |
| *H01M 10/653* | (2014.01) |
| *H01M 50/211* | (2021.01) |
| *H01M 50/271* | (2021.01) |
| *H01M 50/296* | (2021.01) |
| *H01M 50/507* | (2021.01) |

(52) U.S. Cl.
CPC ....... *H01M 10/653* (2015.04); *H01M 50/211* (2021.01); *H01M 50/271* (2021.01); *H01M 50/296* (2021.01); *H01M 50/507* (2021.01)

(58) Field of Classification Search
USPC .......................................................... 429/90
See application file for complete search history.

(56) References Cited

U.S. PATENT DOCUMENTS

| | | | |
|---|---|---|---|
| 2014/0023906 A1 | 1/2014 | Hashimoto et al. | |
| 2016/0056427 A1* | 2/2016 | Kim ................... | H01M 50/512 |
| | | | 429/151 |
| 2018/0287184 A1 | 10/2018 | Lee et al. | |
| 2018/0358592 A1* | 12/2018 | Park ........................ | C08K 5/49 |

| | | | |
|---|---|---|---|
| 2019/0131596 A1 | 5/2019 | Yang et al. | |
| 2020/0343499 A1 | 10/2020 | Yoo et al. | |
| 2021/0066685 A1 | 3/2021 | Lee et al. | |
| 2021/0328284 A1 | 10/2021 | Kim | |

FOREIGN PATENT DOCUMENTS

| | | | | | |
|---|---|---|---|---|---|
| CN | 111162221 | A | 5/2020 | | |
| CN | 111477808 | A | 7/2020 | | |
| CN | 210984837 | U | 7/2020 | | |
| DE | 102011111930 | A1 * | 2/2013 | .......... | H01M 50/227 |
| JP | 11-86811 | A | 3/1999 | | |
| JP | 2004-039588 | A | 2/2004 | | |
| JP | 2004130910 | A * | 4/2004 | | |
| JP | 3821085 | B2 | 9/2006 | | |
| JP | 2007-299544 | A | 11/2007 | | |
| JP | 2008-066000 | A | 3/2008 | | |
| JP | 2009-206006 | A | 9/2009 | | |
| JP | 2011-159474 | A | 8/2011 | | |
| JP | 2018-185961 | A | 11/2018 | | |
| KR | 10-0982468 | B1 | 9/2010 | | |
| KR | 10-2020-0004186 | A | 1/2020 | | |
| KR | 10-2020-0008624 | A | 1/2020 | | |
| KR | 10-2074202 | B1 | 2/2020 | | |
| KR | 10-2020-0086958 | A | 7/2020 | | |
| WO | 2020/145602 | A1 | 7/2020 | | |

\* cited by examiner

BATTERY MODULE TO WHICH HEAT SHRINKABLE FILM IS APPLIED, AND BATTERY PACK AND VEHICLE INCLUDING SAME

CROSS-REFERENCE TO RELATED APPLICATIONS

This application is a National Phase entry pursuant to 35 U.S.C. § 371 of International Application No. PCT/KR2021/010979 filed on Aug. 18, 2021, and claims priority to and the benefit of Korean Patent Application No. 10-2020-0105288 filed on Aug. 21, 2020 with the Korean Intellectual Property Office, the disclosure of which is incorporated herein by reference in its entirety.

TECHNICAL FIELD

The present disclosure relates to a battery module to which a thermal shrink film is applied, and a battery pack and a vehicle including the same, and more specifically, to a battery module having a structure in which an outer surface of a cell stack assembly is covered with a thermal shrink film, and a battery pack and a vehicle including the same.

BACKGROUND

A battery module applied to a battery pack for a vehicle has a structure in which bus bar frames are respectively coupled to both longitudinal sides of a cell stack formed by stacking a plurality of battery cells to electrically connect the battery cells to each other, and a cell stack assembly where the cell stack and a bus bar frame are coupled is accommodated in a module housing. In addition, the battery module applied to a battery pack for a vehicle has a structure in which end plates are respectively coupled to both longitudinal sides of the module housing.

In manufacturing this type of battery module for a vehicle, in order to insulate the cell stack assembly, it is necessary to apply an insulation component to prevent contact between the cell stack of the cell stack assembly and the module housing. In addition, for the insulation of the cell stack assembly, it is necessary to apply an insulation component to prevent contact between the bus bar frame of the cell stack assembly and the end plate.

If insulating components are individually applied to every part where insulation is required, the number of components required for manufacturing the battery module increases, which inevitably increases the manufacturing cost and complicates the manufacturing process as much as the increased number of components, thereby deteriorating the productivity.

In addition, in the battery module, if an insulating component is individually applied to a region where insulation is required, a gap is inevitably generated at the boundary between the area covered by the insulating component and an area adjacent thereto, which makes it difficult to achieve complete insulation.

Therefore, regarding the battery module applied to the battery pack for a vehicle, it is required to develop a battery module, which secures the insulation between the cell stack and the module housing, the insulation between the bus bar frame and the end plate, and the insulation of other electrical components applied to the battery module, without increasing the number of components for insulation.

The background description provided herein is for the purpose of generally presenting context of the disclosure.

Unless otherwise indicated herein, the materials described in this section are not prior art to the claims in this application and are not admitted to be prior art, or suggestions of the prior art, by inclusion in this section.

SUMMARY

The present disclosure is designed to solve the problems of the related art, and therefore the present disclosure is directed to providing a battery module, which may secure effective insulation between components of the battery module without increasing the number of components for insulation.

However, the technical problem to be solved by the present disclosure is not limited to the above, and other objects not mentioned herein will be understood from the following description by those skilled in the art.

In one aspect of the present disclosure, there is provided a battery module, comprising: a cell stack assembly including a cell stack having a plurality of battery cells and a bus bar frame assembly configured to cover one longitudinal side and the other longitudinal side of the cell stack; a thermal shrink film configured to cover the cell stack assembly; a module housing configured to accommodate the cell stack assembly covered by the thermal shrink film; and end plates configured to cover openings respectively formed at one longitudinal side and the other longitudinal side of the module housing.

The bus bar frame assembly may include a bus bar frame configured to cover one longitudinal side and the other longitudinal side of the cell stack; and a plurality of bus bars fixed on the bus bar frame and electrically connected to the battery cells.

The battery module may further comprise a pair of module terminals electrically connected to the cell stack and fixed on the bus bar frame.

The pair of module terminals may be exposed to the outside of the thermal shrink film.

The battery module may further comprise a sensing connector provided at one longitudinal side or the other longitudinal side of the cell stack assembly covered by the thermal shrink film and electrically connected to the battery cells.

The sensing connector may be exposed to the outside of the thermal shrink film.

The module housing may include a U frame configured to accommodate the cell stack assembly covered by the thermal shrink film; and a cover frame coupled to the U frame from a location above the U frame.

The battery module may further comprise a thermal conductive unit interposed between an inner surface of the U frame and a bottom surface of the cell stack assembly covered by the thermal shrink film.

The thermal conductive unit may include a thermal conductive resin.

The thermal shrink film may include an exposed portion formed at a location corresponding to the thermal conductive unit.

A battery pack and a vehicle according to an embodiment of the present disclosure to accomplish the above object comprises the battery module according to an embodiment of the present disclosure as described above.

According to embodiments of the present disclosure, a battery module is provided. The battery module may include a cell stack assembly. The cell stack may include a plurality of battery cells and a bus bar frame assembly covering a first side of the cell stack and a second side of the cell stack. The battery module may further include: a thermal shrink film covering the cell stack assembly; a module housing accommodating the cell stack assembly covered by the thermal shrink film; and an end plate covering an opening at a first side of the module housing or a second side of the module housing.

According to embodiments of the present disclosure, the bus bar frame assembly may comprise: a bus bar frame covering the first side of the cell stack and the second side of the cell stack; and a plurality of bus bars on the bus bar frame which are electrically connected to the plurality of battery cells. The battery module further comprises a pair of module terminals on the bus bar frame which are electrically connected to the cell stack. The pair of module terminals may be exposed to the outside of the thermal shrink film. The battery module further comprises a sensing connector on the first side or the second side and the sensing connector is electrically connected to the battery cells. The sensing connector may be exposed to the outside of the thermal shrink film.

According to embodiments of the present disclosure, the module housing may comprise: a U frame accommodating the cell stack assembly; and a cover frame coupled to the U frame. The battery module may comprise a thermal conductive unit between an inner surface of the U frame and a bottom surface of the cell stack assembly covered by the thermal shrink film. The thermal conductive unit may include a thermal conductive resin. The thermal shrink film may include an opening formed at a location corresponding to the thermal conductive unit.

According to embodiments of the present disclosure a battery pack may comprising the battery module disclosed above may be provided. A vehicle comprising the battery module disclosed above may be provided. A sensing connector assembly including a temperature sensor mounted on a sensing line on an upper surface of the cell stack assembly.

According to embodiments of the present disclosure, a method of manufacturing a battery module may be provided. The method may comprise: forming a cell stack assembly by: stacking a plurality of battery cells to form a cell stack; and covering a first side of the cell stack and a second side of the cell stack with a bus bar frame assembly. The method may further comprise: covering the cell stack assembly with a thermal shrink film; placing the cell stack assembly covered by the thermal shrink film into a module housing; and covering an opening at a first side of the module housing or a second side of the module housing with an end plate. The method may further comprise applying heat to the thermal shrink film to fasten the cell stack and the bus bar frame assembly.

According to embodiments of the present disclosure, a battery module may be provided. The battery module may include a cell stack assembly; a thermal shrink film covering the cell stack assembly; a module housing accommodating the cell stack assembly covered by the thermal shrink film; and an end plate covering an opening at a side of the module housing. The thermal shrink film may comprises a plurality of openings. The cell stack assembly comprises a module terminal. The module terminal may be arranged through at least one of the plurality of openings. The at least one of the plurality of openings may have a shape that corresponds to the shape of the module terminal. The cell stack assembly may comprise a sensing connector, and the sensing connector is arranged through at least one of the plurality of openings.

According to an embodiment of the present disclosure, it is possible to secure effective insulation between components of the battery module without increasing the number of components for insulation, thereby improving the battery quality and reducing the manufacture cost. In addition, the convenience of the battery module manufacturing process may be enhanced.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Figure 1:
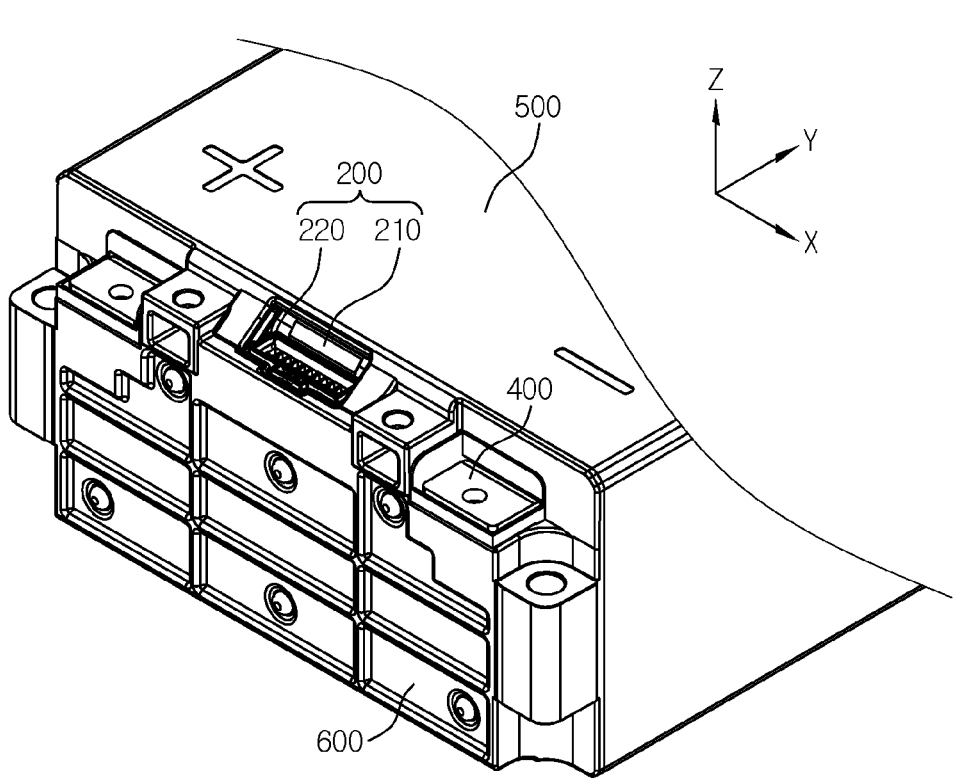
FIG. 1 is a diagram showing a battery module according to an embodiment of the present disclosure.
Figure 2:
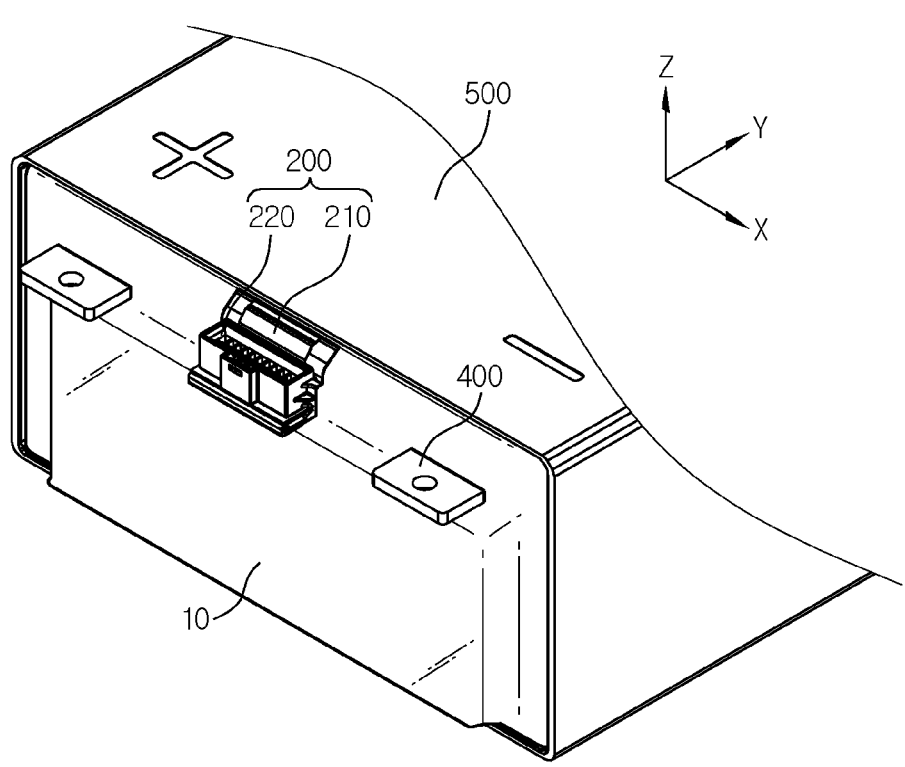
FIG. 2 is a diagram showing a state where an end plate is removed from the battery module depicted in FIG. 1.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Referring to FIGS. 1 to 6, a battery module according to an embodiment of the present disclosure includes a cell stack 100, a bus bar frame assembly 300, a thermal shrink film 10, a module housing 500 and an end plate 600. The battery module may further include a sensing connector assembly 200 and/or a module terminal 400.

Figure 7:
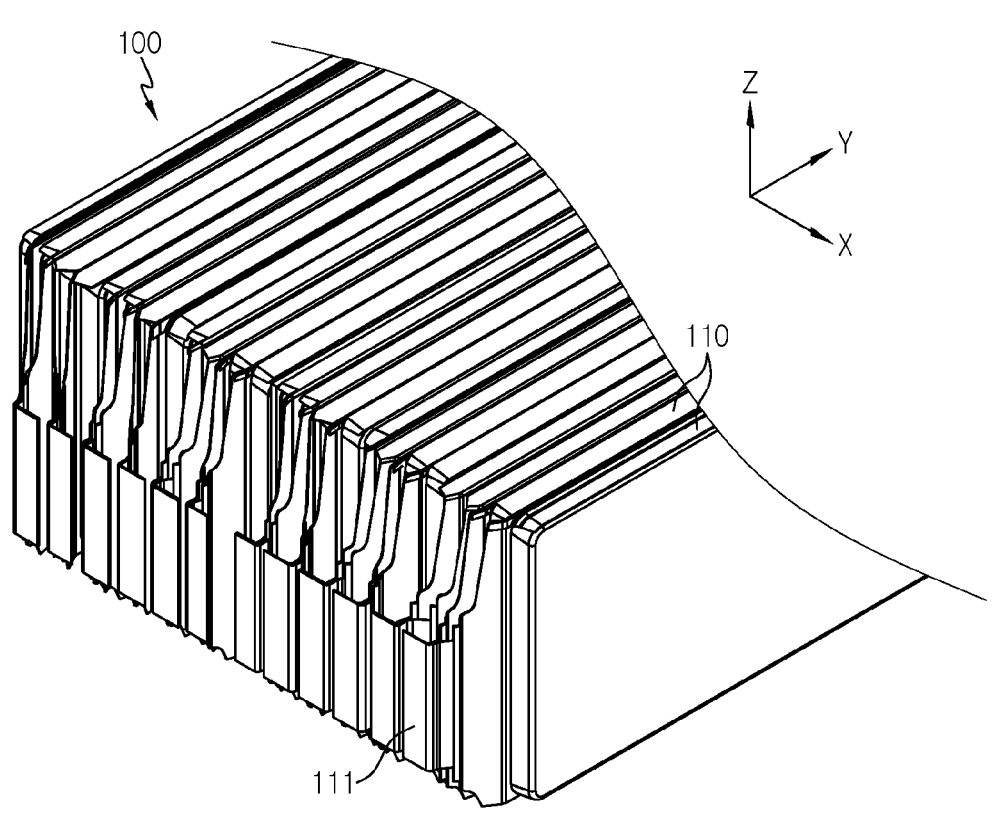
FIG. 7 is a diagram showing a cell stack according to the present disclosure.
Figure 8:
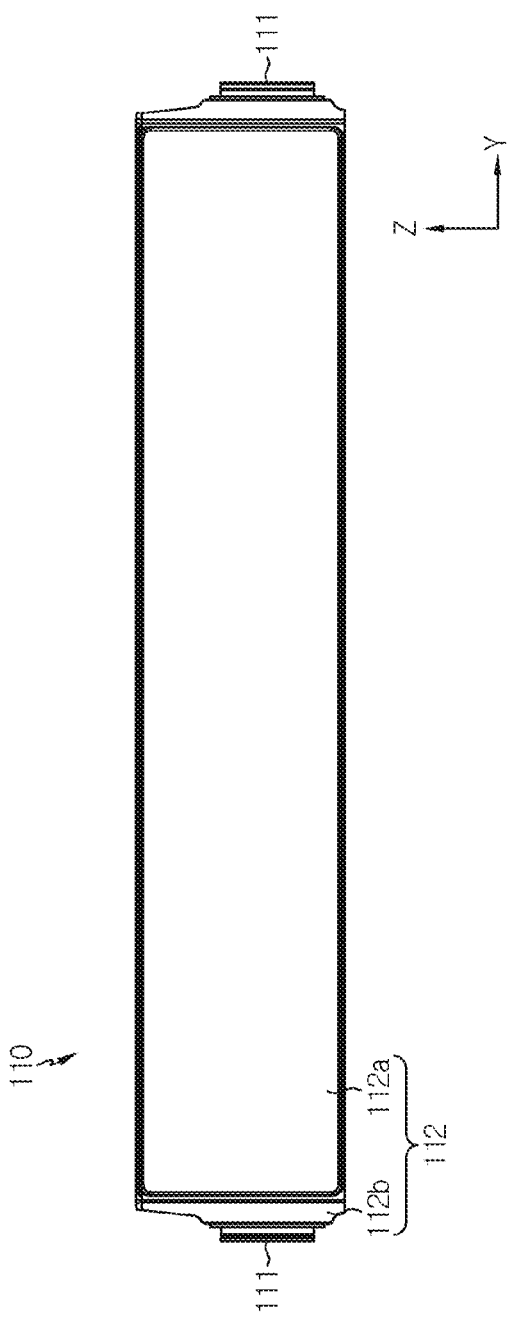
FIG. 8 is a diagram showing a battery cell according to the present disclosure.

Referring to FIGS. 7 and 8, the cell stack 100 includes a plurality of battery cells 110 stacked such that wide surfaces thereof face each other. The battery cell 110 may be a pouch-type battery cell. The pouch-type battery cell 110 includes an electrode assembly (not shown), a pair of electrode leads 111 and a cell case 112.

The pair of electrode leads 111 are connected to a positive electrode tab (not shown) and a negative electrode tab (not shown) of the electrode assembly, respectively, and are drawn out of the cell case 112. The cell case 112 includes an electrode assembly accommodating portion 112*a* and a sealing portion 112*b* extending outward from the circumference of the electrode assembly accommodating portion 112*a*. The pair of electrode leads 111 are drawn out of the cell case 112 through the sealing portion 112*b*.

The pair of electrode leads 111 may be drawn out, for example, to one longitudinal side and the other longitudinal side of the battery cell 110, respectively. That is, the battery cell 110 applied to the present disclosure may correspond to a bidirectional draw-out type battery cell in which a positive electrode lead and a negative electrode lead are drawn out in opposite directions.

In addition, the pair of electrode leads 111 may be positioned while being biased toward one side from the center of the battery cell 110 in a width direction (Z-axis direction of FIG. 7). Specifically, the pair of electrode leads 111 are positioned to be biased toward one side from the center of the battery cell 110 in the width direction, and may be biased downward along a height direction (Z-axis direction in FIG. 6) of the cell stack 100.

If the pair of electrode leads 111 are positioned to be biased toward one side from the center of the battery cell 110 in the width direction as above, a space for installing the module terminal 400, explained later, may be formed, thereby improving the energy density of the battery module. The increase in energy density due to the structure in which the electrode leads 111 are installed to be biased will be described later in detail.

Figure 6:
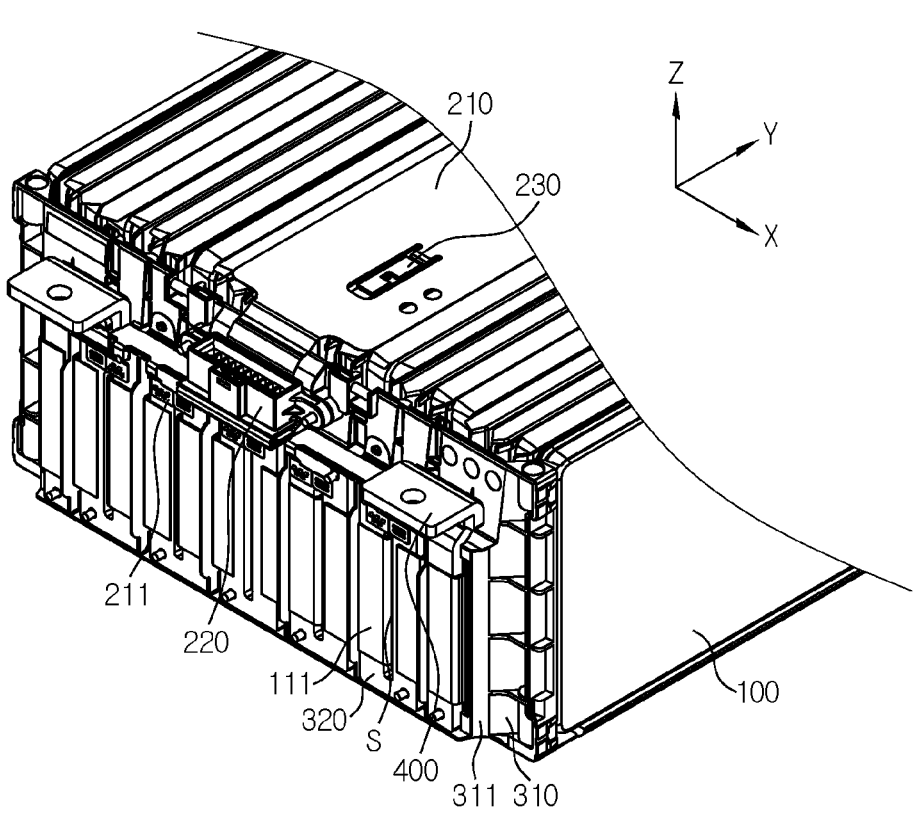
FIG. 6 is a diagram showing a state where an upper cover is removed from the cell stack assembly depicted in FIG. 5.

Referring to FIG. 6, the sensing connector assembly 200 includes a sensing line 210 and a sensing connector 220. The sensing line 210 extends along a longitudinal direction (parallel to the Y-axis) of the battery module to cover at least a portion of the top surface of the cell stack 100, and both ends of the sensing line 210 are bent and positioned on the bus bar frame assembly 300. Connection terminals 211 are provided at both ends of the bent sensing line 210, and the connection terminals 211 are connected to the bus bar 320 and/or the module terminal 400 so that the sensing line 210 is electrically connected to the battery cell 110. The sensing line 210 may be a flexible printed circuit board (FPCB).

The sensing connector 220 is exposed to the outside of the module housing 500 and mounted on the sensing line 210 bent toward the bus bar frame assembly 300. The sensing connector 220 may be disposed in a space formed above the electrode lead 111 according to the biasing of the electrode lead 111. This arrangement position of the sensing connector 220 minimizes the increase in the volume of the battery module caused by the installation of the sensing connector 220, thereby increasing the energy density of the battery module.

The sensing connector 220 is electrically connected to the battery cells 110 through the sensing line 210. In addition, a control device (not shown) such as a BMS is connected to the sensing connector 220, and the control device receives information about the voltage of the battery cells 110 and controls charging and discharging of the battery module with reference to the information.

Meanwhile, the sensing connector assembly 200 may further include a temperature sensor 230 mounted on the sensing line 210 on the upper surface (a surface parallel to the X-Y plane) of the cell stack 100. The temperature sensor 230 may be mounted on a temperature sensor placing portion formed by cutting a part of the sensing line 210 provided in the form of an FPCB. One longitudinal end of the temperature sensor placing portion is formed as a fixed end, and the longitudinal other end is formed as a free end. Accordingly, the temperature sensor placing portion may freely move up and down despite the characteristics of the FPCB having a certain degree of rigidity. Accordingly, the temperature sensor 230 mounted on the temperature sensor placing portion may be indirectly in close contact with the cell stack 100 through the temperature sensor placing portion to accurately measure the temperature of the cell stack 100.

Figure 3:
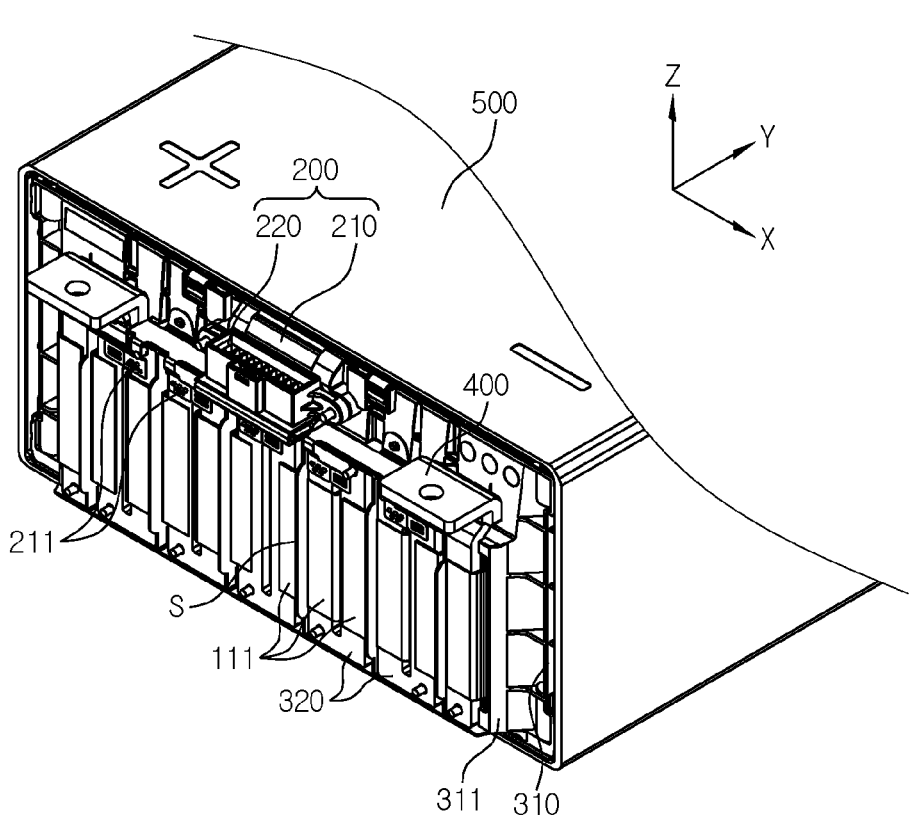
FIG. 3 is a diagram showing a state where a thermal shrink film is removed from the battery module depicted in FIG. 2.

Referring to FIG. 3, the bus bar frame assembly 300 includes a bus bar frame 310 for covering one longitudinal side and the other longitudinal side of the cell stack 100, and includes a plurality of bus bars 320 fixed on the bus bar frame 310 and electrically connected to the battery cell 110.

The bus bar frame 310 may be made of, for example, an insulating material such as resin, and includes a bus bar placing portion 311 formed to protrude at a location corresponding to the electrode leads 111 of the battery cell 110. The bus bar placing portion 311 is formed at a location biased downward from the center of the cell stack 100 in the height direction (parallel to the Z-axis), like the electrode lead 111. Like the biasing of the electrode lead 111, the biasing of the bus bar placing portion 311 is to secure the installation space of components.

The bus bar placing portion 311 includes a plurality of lead slits S formed at locations corresponding to electrode leads 111. The electrode leads 111 are drawn out of the bus bar frame 310 through the lead slits S, and the drawn electrode leads 111 are bent and fixed on the bus bar 320 by welding or the like.

The external terminal 400 is provided in a pair, and the pair of external terminals 400 are connected to the electrode leads 111 of the battery cell 110 located at both outermost sides of the cell stack 100 in the width direction (parallel to the X-axis), respectively.

The external terminal 400 is located in the space formed above the electrode lead 111 and the bus bar placing portion 311 due to the biasing of the electrode lead 111, similarly to the sensing connector 220 described above. The formation location of the external terminal 400 is to minimize the volume of the battery module increasing due to the installation of the external terminal 400 by utilizing the space formed by the biased installation of the electrode lead 111.

Figure 5:
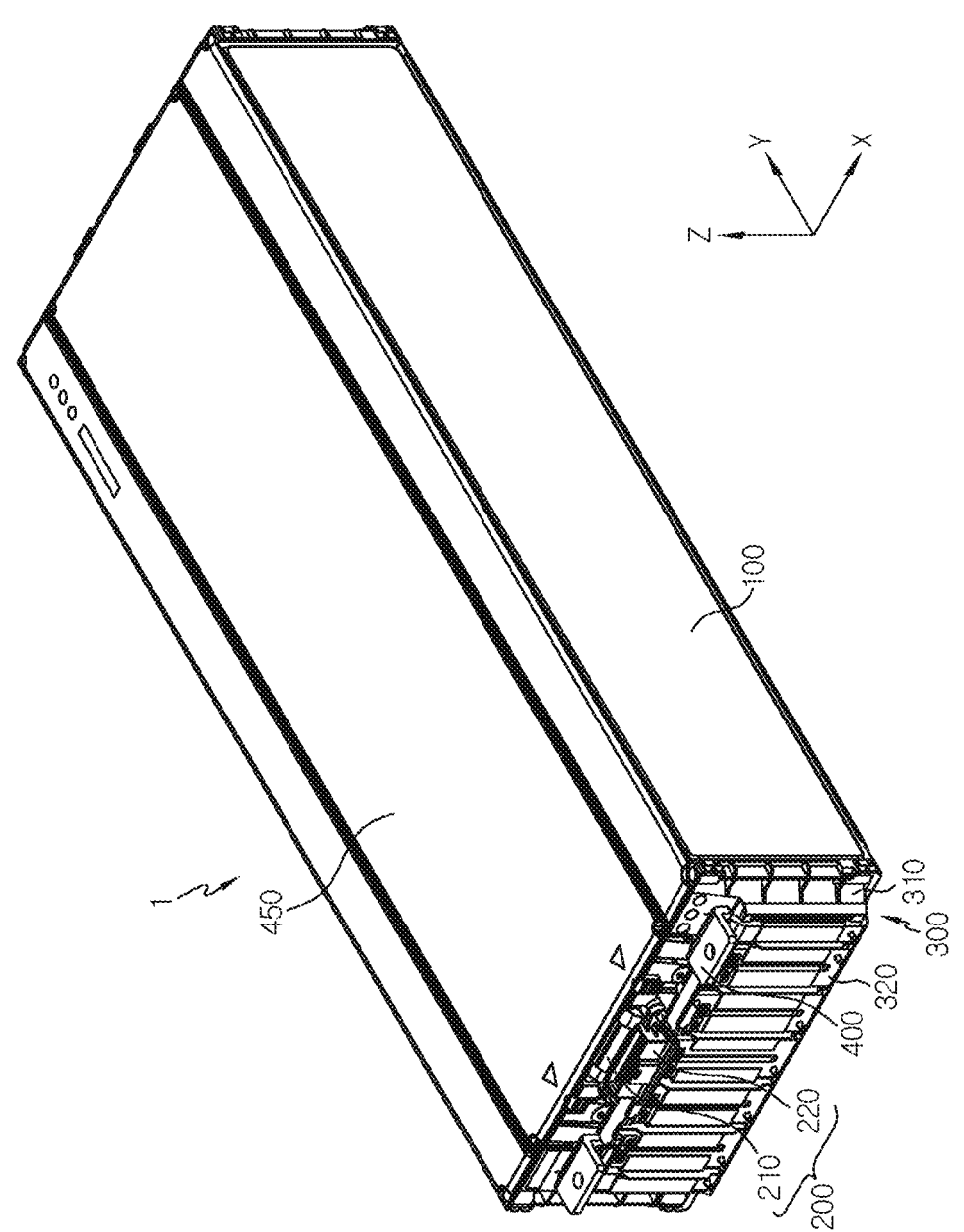
FIG. 5 is a diagram showing the cell stack assembly according to the present disclosure.

Referring to FIG. 5, the cell stack assembly 1 of the present disclosure includes a cell stack 100 and a bus bar frame assembly 300. The cell stack assembly 1 may further include a sensing connector assembly 200 and/or a module terminal 400. The cell stack assembly 1 may further include an upper cover 450 that covers the upper surface of the cell stack 100 (a surface parallel to the X-Y plane). The upper cover 450 may be hinged with the pair of bus bar frames 310, respectively. In this case, a gap is formed in the fastened portion between the upper cover 450 and the bus bar frame 310, so that the sensing line 210 crossing the upper surface of the cell stack 100 along the longitudinal direction (parallel to the Y-axis) of the cell stack 100 is drawn to the outside of the upper cover 450 through the gap.

The sensing connector 220 is mounted on the sensing line 210 drawn to the outside of the upper cover 450 through the gap formed in the fastening portion between the upper cover 450 and the bus bar frame 310.

Figure 4:
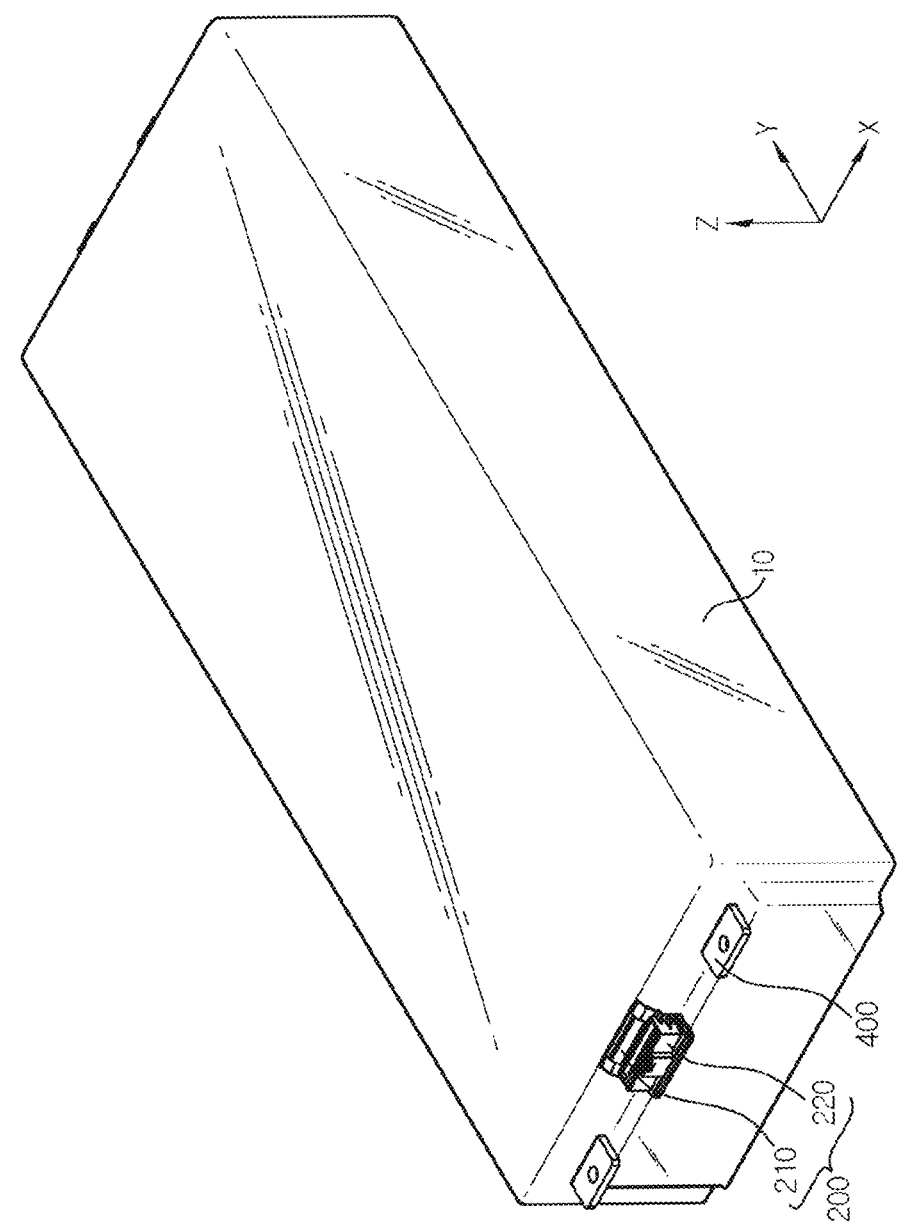
FIG. 4 is a diagram showing a state where a surface of a cell stack assembly according to the present disclosure is covered with a thermal shrink film.

Referring to FIGS. 4 and 5, the surface of the cell stack assembly 1 may be covered by the thermal shrink film 10. The thermal shrink film 10 has insulation and has a property of shrinking when heat of a certain level or more is applied thereto, and may be, for example, a PVC film.

The thermal shrink film 10 may be provided to cover the outer surface of the cell stack assembly 1 entirely. That is, the thermal shrink film 10 covers the upper and lower surfaces and both side surfaces of the cell stack 100 and also covers the surface of the bus bar frame assembly 300 coupled to the front and rear surfaces (parallel to the X-Z plane) of the cell stack 100. If the cell stack assembly 1 includes the upper cover 450, the thermal shrink film 10 covers the upper cover 450 instead of covering the upper surface of the cell stack 100.

Meanwhile, the sensing connector 220 and/or the pair of module terminals 400 are exposed to the outside of the thermal shrink film 10. That is, the thermal shrink film 10 has a shape opened at a location corresponding to the sensing connector 220 and/or the module terminal 400.

The thermal shrink film 10 covers the surface of the cell stack assembly 1 and secures insulation between the metal module housing 500 and the cell stack 100. In addition, the thermal shrink film 10 also functions to insulate the electrode lead 111 and the bus bar 320 disposed on the bus bar frame 310 from the end plate 600 made of a metal material. That is, by applying the thermal shrink film 10, it is possible to omit components applied for insulation.

In addition, the thermal shrink film 10 may bind the battery cells 110 of the cell stack 100 by shrinking when the battery module is heated, and may also reinforce the fastening force between the cell stack 100 and the bus bar frame assembly 300 and the fastening force between the cell stack 100 and the upper cover 450s.

Figure 9:
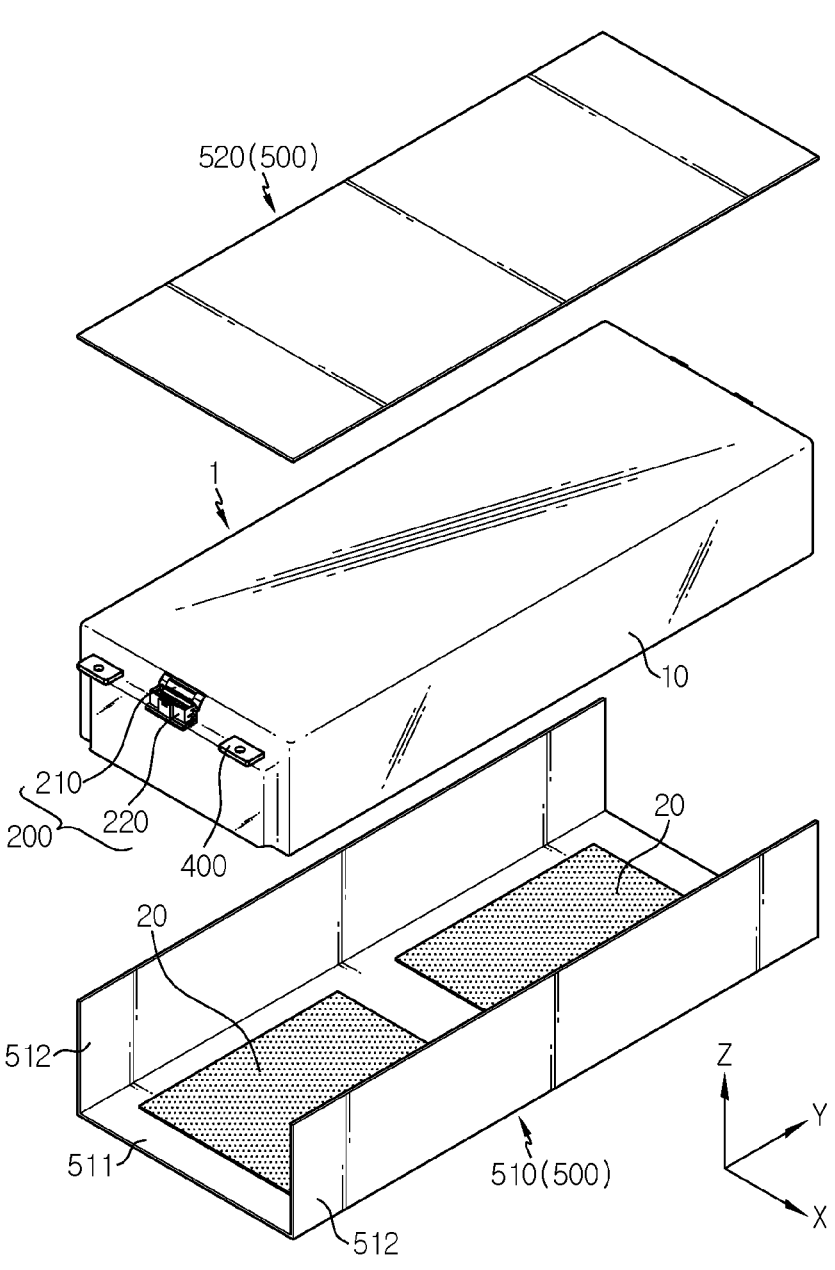
FIG. 9 is an exploded perspective view showing a cell stack assembly and a module housing, covered by the thermal shrink film.

Referring to FIG. 9, the module housing 500 includes a U frame 510 and a cover frame 520. The U frame 510 has an approximately U-shaped cross-section. The U frame 510 accommodates the cell stack assembly 1 covered by the thermal shrink film 10. The U frame 510 includes a base plate 511 for supporting the bottom surface (parallel to the X-Y plane) of the cell stack assembly 1 covered by the thermal shrink film 10 and a pair of side plate 512 for covering the side surface (parallel to the Y-Z plane) of the cell stack assembly 1 covered by the thermal shrink film 10. The base plate 511 and the pair of side plates 512 may be integrally formed. Alternatively, the base plate 511 and the pair of side plates 512 may be provided individually and coupled with each other to form the U frame 510.

The cover frame 520 covers the upper surface (parallel to the X-Y plane) of the cell stack assembly 1 covered by the thermal shrink film 10 and is coupled to the U frame 510 from a location above the U frame 510. That is, the module housing 500 may have a two-part structure. Therefore, after the cell stack assembly 1 covered by the thermal shrink film 10 is placed in the U frame 510, the cover frame 520 may be coupled to the U frame 510 by welding or the like.

Meanwhile, the battery module according to an embodiment of the present disclosure may further include a thermal conductive unit 20 interposed between the base plate 511 of the U frame 510 and the bottom surface of the cell stack assembly 1 covered by the thermal shrink film 10. The thermal conductive unit 20 may include a thermal conductive resin (thermal resin). For example, the thermal conductive unit 20 may be formed by applying a thermal conductive resin paste on the base plate 511. Alternatively, the thermal conductive unit 20 may be provided in the form of a pad including a thermal conductive resin. The thermal conductive unit 20 may be applied to maximize the contact area between the base plate 511 and the cell stack assembly 1 covered by the thermal shrink film 10. By applying the thermal conductive unit 20, the heat generated in the cell stack 100 may be easily discharged to the outside through the lower surface of the module housing 500.

The thermal conductive unit 20 may be provided, for example, in plural, and the plurality of thermal conductive units 20 may be disposed to be spaced apart from each other in the longitudinal direction (parallel to the Y-axis) of the cell stack 100. If a plurality of thermal conductive units 20 are provided, at least a pair of the thermal conductive units 20 may be respectively located at both ends of the base plate 511 in the longitudinal direction (parallel to the Y-axis). This is to increase the cooling efficiency by sufficiently cooling the region close to the electrode lead 111 at which a large amount of heat is generated. Meanwhile, the thermal conductive unit 20 may not be applied at the center of the bottom surface of the cell stack assembly 1 in the longitudinal direction (parallel to the Y-axis). This is to minimize the amount of thermal conductive resin applied to form the thermal conductive unit 20 by intensively applying the thermal conductive unit 20 to an area where a relatively large amount of heat is generated.

Figure 10:
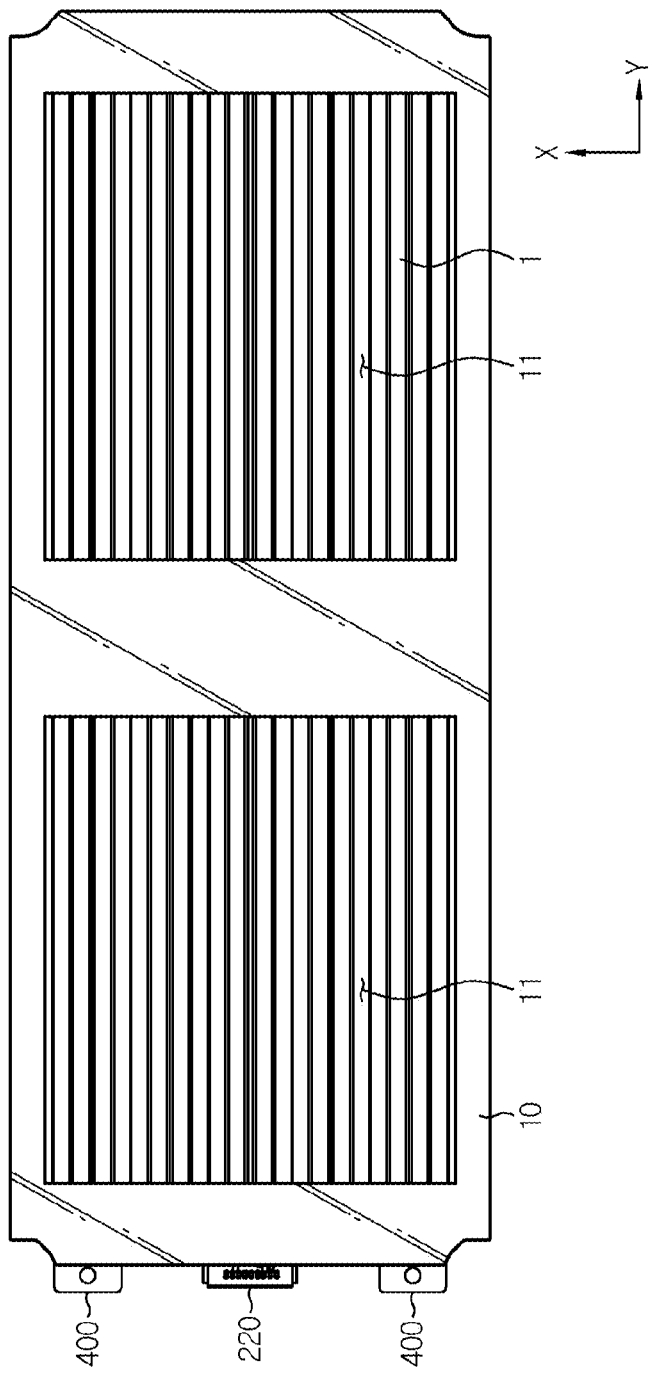
FIG. 10 is a diagram showing a bottom surface of the cell stack assembly, which is covered by the thermal shrink film.

Referring to FIG. 10 along with FIG. 9, if the battery module includes the thermal conductive unit 20, the thermal shrink film 10 includes an exposed portion 11 formed at a position corresponding to the thermal conductive unit 20. The thermal conductive unit 20 comes into contact with the bottom surface (parallel to the X-Y plane) of the cell stack assembly 1 exposed through the exposed portion 11.

Referring to FIGS. 3 and 8 along with FIGS. 9 and 10, the thermal shrink film 10 completely covers an area of the bottom surface of the cell stack assembly 1 corresponding to the bus bar frame 300 and an area thereof corresponding to the sealing portion 112b of the battery cell 110, and also covers a part of the electrode assembly accommodating portion 112a adjacent to the sealing portion 112b. Due to the application range of the thermal shrink film 10, after the thermal conductive resin is applied on the inner surface of the U frame 510, it is possible to prevent the thermal conductive resin from spreading toward the electrode lead 111 in the step of placing the cell stack assembly 1 covered by the thermal shrink film 10 in the U frame 510.

Referring to FIG. 1, the end plate 600 covers the openings respectively formed at one side and the other side of the module housing 500 in the longitudinal direction (parallel to the Y-axis). The end plate 600 may be coupled with the module housing 500. The sensing connector 220 and the module terminal 400 are exposed to the outside of the end plate 600. The end plate 600 may be made of a metal material to ensure rigidity of the battery module. Even if the end plate 600 is made of metal, the surface of the bus bar frame assembly 300 facing the end plate 600 is covered with thermal shrink film 10, thereby securing insulation.

Meanwhile, a battery pack according to an embodiment of the present disclosure includes at least one battery module according to an embodiment of the present disclosure as described above. In addition, a vehicle according to an embodiment of the present disclosure includes at least one battery pack according to an embodiment of the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module, comprising:
a cell stack assembly including:
   a cell stack having a plurality of battery cells; and
   a bus bar frame assembly covering a first side of the cell stack and a second side of the cell stack;
a thermal shrink film covering the cell stack, the thermal shrink film fastening the plurality of battery cells together;
a module housing accommodating the cell stack assembly including the thermal shrink film; and
an end plate covering an opening at a first side of the module housing or a second side of the module housing.

2. The battery module according to claim 1, wherein the bus bar frame assembly comprises:
a bus bar frame covering the first side of the cell stack and the second side of the cell stack; and
a plurality of bus bars on the bus bar frame which are electrically connected to the plurality of battery cells.

3. The battery module according to claim 2, wherein the battery module further comprises a pair of module terminals on the bus bar frame which are electrically connected to the cell stack.

4. The battery module according to claim 3, wherein the pair of module terminals are exposed to the outside of the thermal shrink film.

5. The battery module according to claim 1, wherein the battery module further comprises a sensing connector on the first side or the second side and the sensing connector is electrically connected to the battery cells.

6. The battery module according to claim 5, wherein the sensing connector is exposed to the outside of the thermal shrink film.

7. The battery module according to claim 1, wherein the module housing comprises:
a U frame accommodating the cell stack assembly; and
a cover frame coupled to the U frame.

8. The battery module according to claim 7, further comprising a thermal conductive unit between an inner surface of the U frame and a bottom surface of the cell stack assembly covered by the thermal shrink film.

9. The battery module according to claim 8, wherein the thermal conductive unit includes a thermal conductive resin.

10. The battery module according to claim 8, wherein the thermal shrink film includes an opening formed at a location corresponding to the thermal conductive unit.

11. A battery pack, comprising the battery module according to claim 1.

12. A vehicle, comprising the battery module according to claim 1.

13. A method of manufacturing a battery module comprising:
forming a cell stack assembly by:
   stacking a plurality of battery cells to form a cell stack; and
   covering a first side of the cell stack and a second side of the cell stack with a bus bar frame assembly;
covering the cell stack with a thermal shrink film that fastens the plurality of battery cells together;
placing the cell stack assembly including the thermal shrink film into a module housing; and
covering an opening at a first side of the module housing or a second side of the module housing with an end plate.

14. The method according to claim 13, further comprising covering the bus bar frame assembly with the thermal shrink film.

15. The battery module according to claim 1, further comprising a sensing connector assembly including a temperature sensor mounted on a sensing line on an upper surface of the cell stack assembly.

16. A battery module, comprising:
a cell stack assembly;
a thermal shrink film covering the cell stack assembly;
a module housing accommodating the cell stack assembly covered by the thermal shrink film; and
an end plate covering an opening at a side of the module housing,
wherein the thermal shrink film comprises a plurality of openings, and
the cell stack assembly comprises a module terminal,
wherein the module terminal is arranged through at least one of the plurality of openings.

17. The battery module according to claim 16, wherein the at least one of the plurality of openings has a shape that corresponds to a shape of the module terminal.

18. The battery module according to claim 16, wherein the cell stack assembly comprises a sensing connector, and
wherein the sensing connector is arranged through at least one of the plurality of openings.

19. The battery module according to claim 1, further comprising the thermal shrink film covering the bus bar frame assembly.

20. The method according to claim 14, further comprising applying heat to the thermal shrink film to fasten the cell stack and the bus bar frame assembly.

* * * * *